MULTI-COLLECTOR TRANSISTOR PROVIDING DIFFERENT OUTPUT IMPEDANCES, AND METHOD OF PRODUCING SAME
Filed Dec. 28, 1955

INVENTOR.
ARTHUR H. DICKINSON
BY Joseph C. Sweet, Jr.
ATTORNEY

United States Patent Office 2,882,463
Patented Apr. 14, 1959

2,882,463

MULTI-COLLECTOR TRANSISTOR PROVIDING DIFFERENT OUTPUT IMPEDANCES, AND METHOD OF PRODUCING SAME

Arthur H. Dickinson, Greenwich, Conn., assignor to International Business Machines Corporation, New York, N.Y., a corporation of New York Application December 28, 1955, Serial No. 555,899

5 Claims. (Cl. 317—235)

This invention relates to transistors having a plurality of collector electrodes providing different output impedances, the method of producing such transistors, and circuits utilizing such transistors.

In my copending application Serial No. 255,266, filed November 7, 1951, now U.S. Patent No. 2,755,536, there was disclosed a method of electroforming a transistor during its manufacture, wherein successive progressively increasing pulses of energy are applied between the collector and base electrodes, the polarity of the applied pulses being preferably such as to cause current to flow in the forward direction through the collector electrode. Further, these pulses are preferably applied while the collector current vs. collector voltage characteristics for different values of emitter voltage or current are being observed, as on the screen of a cathode ray tube oscilloscope. Finally, the material disclosed as suitable for use for the collector was tungsten or platinum-iridium, and preferably the collector was of platinum-10% iridium material.

As set forth in that application, such a collector electrode manifests a high output impedance, the resultant transistor possesses pentode-like characteristics, and the region of these characteristics in which the current gain is greater than unity is fairly limited.

Briefly, in accordance with the present invention, I have found that if a second collector electrode is added to such a structure with the collector being of a donor-including material (preferably including an element from group V of the periodic table, e.g., Phosphor bronze is a suitable material), and this second collector electrode is then electroformed in a manner similar to the first, except that the applied electroforming pulses are of a potential to cause current flow through this collector electrode in the reverse direction, the resultant characteristics of this second collector electrode differ markedly from those of the first. This second collector electrode manifests a low output impedance. As to it, the transistor possesses a current gain greater than unity over an appreciable operating range, and the characteristic curves therefor are similar to those of a conventional triode. There is thus provided a multi-collector transistor providing different output impedances which is of great value in many circuits and particularly in trigger circuits.

Accordingly, a principal feature of this invention is to provide a transistor having at least two collector electrodes manifesting different output impedances.

Another feature of this invention is to provide a method of producing such a transistor.

Still another feature of this invention is to provide trigger circuits utilizing such a transistor with the different collector electrodes providing independent output circuits.

Other features of my invention will be poined out in the following description and claims and illustrated in the accompanying drawings which disclose, by way of example, the principle of my invention and the best mode which has been contemplated of applying that principle.

Figure 1:
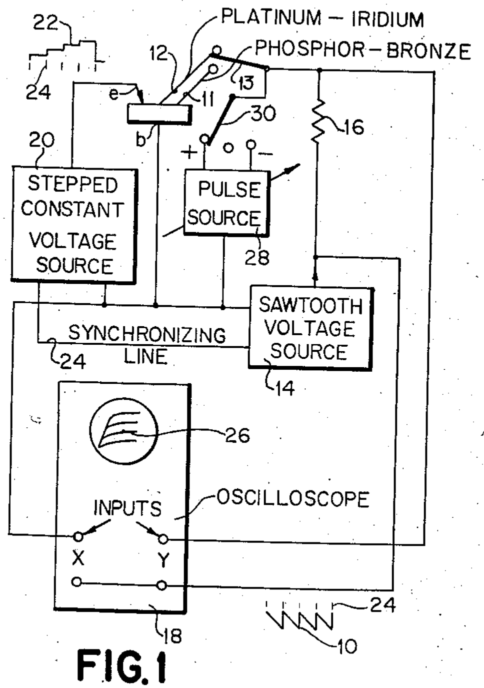
Fig. 1 illustrates in block diagram form a suitable circuit for obtaining transistor characteristics, modified for use in accordance with my invention.

Referring now to Fig. 1, a negative voltage 10 having a repetitive sawtooth waveform voltage, as illustrated, is applied between the base *b* and either of collectors 11 or 12, depending upon the position of switch 13, this sawtooth waveform voltage being obtained from sawtooth voltage source 14. Switch 13 is connected to sawtooth voltage source 14 through resistance 16, the voltage across resistance 16 thus being a measure of the current in the collector circuit. The terminals of resistance 16 are individually connected to the respecive "Y" or vertical input terminals of oscilloscope 18. In order to obtain the desired collector characteristics for different values of constant emitter voltage, a stepped constant voltage source 20 is connected between emitter *e* and base *b* of the transistor, the stepped waveform 22 of the emitter voltage being of "staircase" form, as indicated on the diagram. Timing marks 24 are included adjacent each of waveforms 10 and 22 to indicate that each step of waveform 22 coincides with the duration of exactly one sawtooth of waveform 10, this synchronization being insured because of the provision of synchronizing line 24 connected between sawtooh voltage source 14 and stepped constant voltage source 20. Further, the period of each sawtooth of waveform 10 and each step of waveform 22 is equal to the duration of one horizontal traverse or sweep of the electron beam of oscilloscope 18. This is because the "X" or horizontal input terminals of oscilloscope 18 are connected across the output of sawtooth voltage source 14 as shown. The circuit thus far described produces on the screen of oscilloscope 18 a reproduction of the collector current/voltage characteristics of the transistor, as indicated at 26, the particular collector whose characteristic is being traced being determined, of course, by the position of switch 13. To carry out my invention, I further provide a source 28 of variable potential pulses of both polarities and connect this as shown between the base *b* and switch 13 via 3-position switch 30. When switch 30 is in its center position, pulse source 28 is out of the circuit. When this switch is thrown to the left, however, a positive pulse is applied to the collector electrode selected by switch 13, and when switch 30 is thrown to the right, a negative pulse is applied to the collector elecrode selected by switch 13.

It is to be understood that, as in the conventional manufacture of point-contact transistors, the transistor will be initially prepared as described, for example, in the Coblenz and Owens book entitled Transistors—Theory and Applications (McGraw-Hill, 1955), and that the emitter and collector electrodes will be positioned on the treated crystal surface with a chosen force and with a chosen distance therebetween. Purely by way of example, I have utilized an n-type germanium crystal removed from a type 1N48 crystal diode with the emitter electrode and one collector electrode made of platinum-10% iridium, 0.003 inch in diameter, chisel pointed, spaced apart 0.001 inch, and resting on the treated crystal surface with a force of 20 grams. The second collector electrode is similar and similarly spaced from the emitter electrode and the first collector electrode and is preferably of Phosphor bronze material. The electrode conventionally secured to the opposite surface of the 1N48 crystal serves as the base electrode for the transistor.

As set forth in the above mentioned application, after examining the initial characteristics of the transistor under test as displayed on the screen of oscilloscope 18, I preferably apply an initial positive pulse of short duration between the platinum-iridium collector electrode 12 and the base electrode *b* of the transistor and then again observe the transistor characteristics. If a single pulse does not produce the desired characteristics as to this collector electrode, additional pulses of progressively increasing intensity may be utilized, the transistor characteristics being observed, of course, after the application of each pulse in order to determine at what point electroforming of this collector should be terminated.

Preferably, pulse source 28 includes one or more condensers which may be charged up to progressively increasing values of potential, either automatically after each discharge or by means of the manual control indicated, the condenser then being discharged through the particular collector electrode to which it is connected via switches 13 and 30, with the position of switch 30 determining the polarity of the applied pulse as mentioned previously. In one embodiment, I utilized a 10 microfarad condenser and charged this condenser progressively in 5-volt steps, from 15 to 50 volts, between each application of an energy pulse to the platinum-iridium collector electrode 12. At some point, as the single or successive progressively increasing pulses of energy are applied to the platinum-iridium electrode, it will be found that the transistor output characteristics become substantially like those of a pentode, and that this collector electrode manifests a high output impedance.

Switch 13 is then connected to the Phosphor bronze collector electrode 11 and the process above described then repeated, except that switch 30 is now connected one or more times to the negative output terminal of pulse source 28 in order to electroform the Phosphor bronze collector electrode 11 in the reverse direction. This second electroforming process is continued until the desired triode-like characteristic is obtained for this second collector electrode, at which time this output electrode manifests a low impedance.

It is, of course, desirable that the characteristics of a transistor remain stable during normal handling and usage, and usually transistors treated in accordance with my invention are mechanically stable as well as electrically stable.

However, occasionally a transistor will exhibit microphonics or changes in its characteristic when tapped, even though it has achieved the desired different output characteristics due to the above described electroforming treatments. This condition is usually easily remedied by connecting the pulse source 28 between the emitter and base electrodes of the transistor and applying succesive positive progressively increasing pulses of energy to the emitter electrode. In fact, it will frequently be found that a single 10, 15, or 20 volt pulse in the forward direction of current energy is sufficient to stabilize the transistor mechanically without materially affecting the desired collector characteristics previously obtained through treatment of the individual collector electrodes.

In certain instances, even though the transistor does not exhibit microphonics, it may be desirable, nevertheless, to apply an electroforming treatment to the emitter electrode after the above described treatment of the collector electrodes. The effect of applying successive progressively increasing pulses of energy, as described above, to the emitter electrode is a general flattening of the collector characteristics. However, I have found that the collector characteristics do not change radically until the magnitude of the progressively increasing pulses applied to the emitter exceeds about 70 or 75 volts.

There has thus been described a method of producing a transistor with a plurality of output electrodes, one of which manifests a low output impedance and the other manifesting a high output impedance. If desired, additional output electrodes could be provided, of course, and electroformed in accordance with my invention to produce a desired impedance characteristic for each.

Figure 2:
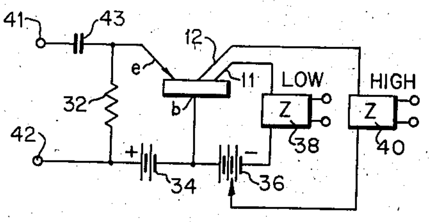
Fig. 2 illustrates a transistor in accordance with my invention connected in an amplifier circuit.

In Fig. 2 is shown a transistor in accordance with my invention connected in an amplifier circuit. Resistance 32 and battery 34 are connected in series between emitter *e* and base *b*, and battery 36 supplies the operating potentials for both collectors 11 and 12 via load impedances 38 and 40, respectively. Note that a low impedance output is thus provided across load impedance 38, and a high impedance output is provided across load impedance 40, the input circuit being applied at input terminals 41 and 42, terminal 41 being coupled to emitter *e* via condenser 43.

A transistor electroformed in accordance with this invention is particularly well adapted for use in a trigger circuit. In such circuits it is not uncommon practice to load the balance maintaining portion of the circuit, but there are limits to which such loading can be carried, beyond which the stability and speed of operation of the circuit rapidly deteriorates. The use of a transistor in accordance with this invention in such a circuit allows one output electrode to be utilized in the balance maintaining portion of the circuit while the other output electrode is utilized as an independent and isolated output to feed succeeding circuitry.

Figure 3:
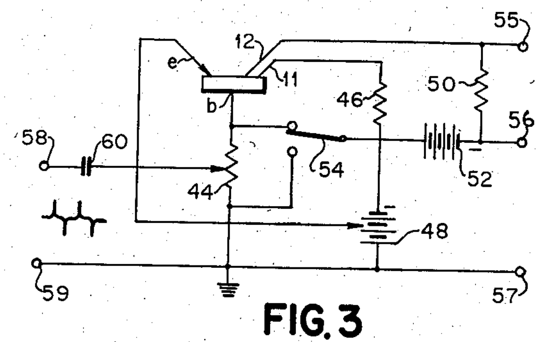
Figs. 3, 4, and 5 illustrate three different trigger circuits, each utilizing a transistor in accordance with my invention.

Fig. 3 shows such a bistable trigger circuit. Base impedance 44 is connected between base *b* and ground, and impedance 46 and battery 48 are connected in series between collector electrode 11 and ground. Emitter electrode *e* is connected to a tap on battery 48, and impedance 50 and battery 52 are connected in series between collector electrode 12 and switch 54. As shown in the drawing, switch 54 is a single pole, double throw switch connected either to base *b* or ground. The output of the circuit may be taken from terminals 55 and 56 (across impedance 50) or, alternatively, from terminals 55 and 57 (ground). The input of the circuit in the form of alternate positive and negative trigger pulses, as shown, is applied to terminals 58 and 59, terminal 58 being coupled via condenser 60 to a tap on base impedance 44. The circuit is switched back and forth between its two stable states in response to successive pulses, a positive pulse switching it "on" and a negative pulse switching it "off." Note that the "balance maintaining" portion of the circuit including impedance 46 is connected to the low impedance collector electrode 11, whereas the "work" or external output portion of the circuit including impedance 50 is connected to the high impedance collector electrode 12.

The availability of such a work circuit manifesting a high impedance is of particular advantage in bistable circuits incorporated in computers and accounting machines, since this can conveniently be used in an indicator circuit. In the past various methods have been resorted to in order to establish visually the "on" and "off" status of bistable circuits incorporating transistors. The use of a voltmeter is awkward and slow when the number of such circuits is large. The control of neon or gaseous indicator tubes by vacuum tubes controlled by transistor bistable circuits adds materially to the cost and volume of the machine, as well as constituting an undesired source of heat. The control of such neon indicator tubes through transistor amplifiers controlled by associated bistable transistor circuits has also been employed, but, here again, this adds to the cost and increases the space required.

Figure 4:
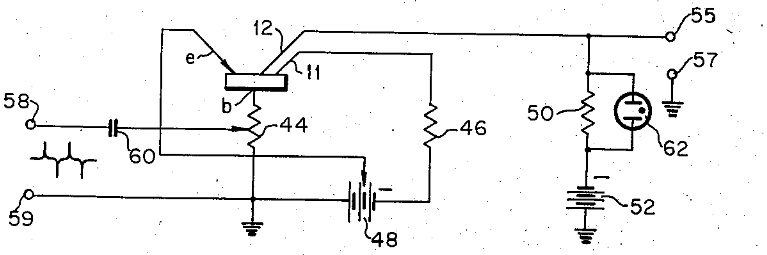

The use of a transistor in accordance with my invention provides a very simple and effective solution to this problem, as indicated in Fig. 4. This circuit is generally similar to that shown in Fig. 3, and corresponding parts have been correspondingly numbered. The major difference is the omission of switch 54, battery 52 now being connected directly to ground, and the addition of a neon indicator light or tube 62 connected across impedance 50. As described above in connection with the circuit of Fig. 3, the circuit switches "on" in response to positive pulses applied to the base impedance 44 via condenser 60, and turns "off" upon the application of a negative pulse. The usual balance maintaining circuit for such a circuit requires a low impedance, and the voltages developed in such a circuit are usually low and too low to actuate neon lamps directly. The use of the second collector electrode of high impedance permits the incorporation of the indicator lamp 62 with no supplementary amplifiers being required. When the bistable circuit is in its "on" condition, lamp 62 glows, and when the circuit is in its "off" condition, the glow is extinguished.

Figure 5:
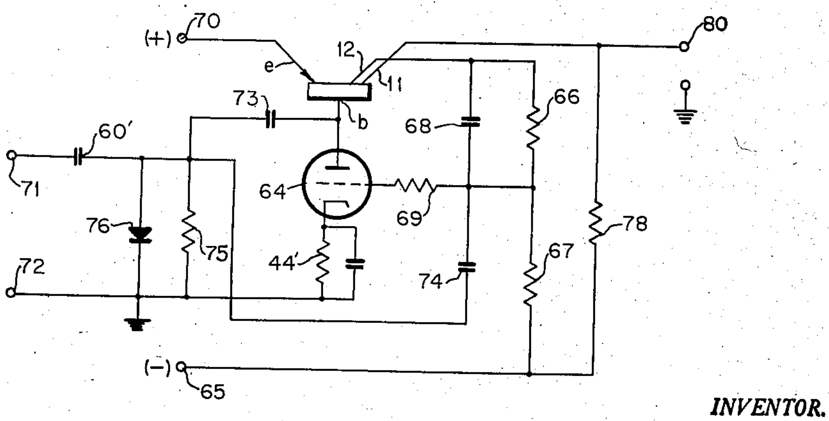

Still another trigger circuit, for which a transistor in accordance with my invention is particularly adaptable, is shown in Fig. 5. This circuit is similar to that shown in my United States Patent 2,623,170, issued December 23, 1952. In this circuit a vacuum tube 64 has its anode-cathode path connected in series between base *b* of the transistor and impedance 44'. The impedance of the balance maintaining portion of such a circuit is preferably high, and accordingly, collector electrode 12 is so utilized and is connected to negative potential terminal 65 via impedances 66 and 67. Impedance 66 is shunted by condenser 68, and the junction of impedances 66 and 67 is coupled to the control grid of tube 64 via impedance 69. Emitter *e* is supplied with a positive operating potential from terminal 70, and the input applied to terminals 71 and 72 is coupled simultaneously to the base *b* and the control grid of the tube via condenser 60' and respective condensers 73 and 74. This circuit is of the scaler type, i.e., it is switched in conduction status in response to successive pulses of the same polarity (in this case, negative), and accordingly, impedance 75 and diode 76 are provided in the input circuit, with diode 76 poled as shown to prevent any unwanted positive pulses from reaching the control elements of the circuit. The second collector electrode 11, which, it will be recalled, manifests a low output impedance, is connected via load impedance 78 to the negative supply terminal 65, and the output for succeeding circuitry is taken between terminal 80 and ground, as shown.

Note that the circuits of Figs. 4 and 5, are, in a sense, opposites in that in Fig. 4 the balance maintaining portion of the circuit is of low impedance and the work portion of the circuit is of high impedance, while in Fig. 5 the balance maintaining portion of the circuit is of high impedance and the work portion of the circuit is of low impedance.

While the circuitry shown in connection with Figs. 2–5 has described transistors having only two collector electrodes, as pointed out previously, transistors having more than two collector electrodes may be constructed in accordance with my invention. Examples of circuitry utilizing transistors having more than two collector electrodes are disclosed in my copending application Serial No. 477,587, filed December 24, 1954, and entitled "Electronic Multipliers."

While there have been shown, described, and pointed out the fundamental novel features of my invention as applied to a preferred embodiment, it will be understood that various omissions and substitutions and changes in the form and details of the devices illustrated and in their operation may be made by those skilled in the art without departing from the spirit of the invention. It is my intention, therefore, to be limited only as indicated by the scope of the following claims.

What is claimed is:

1. In the manufacture of transistors each having a semiconducting body and a plurality of point-contact collector electrodes, the steps of positioning a first point-contact collector electrode of platinum-iridium material in contact with said body and applying to said first collector electrode of platinum-iridium material, successive very short and intense D.C. pulses of progressively increasing intensity and of a polarity to cause current to flow through this first collector electrode in the forward direction, and positioning a second point-contact collector electrode of Phosphor bronze material in contact with said body and applying to said second collector electrode of Phosphor bronze material, successive very short and intense D.C. pulses of progressively increasing intensity to cause current to flow through this second collector electrode in the reverse direction, thereby producing a high output impedance and a current gain less than unity over an appreciable operating range for said first collector electrode, and a low output impedance and a current gain greater than unity over an appreciable operating range for said second collector electrode.

2. In the manufacture of transistors each including a semiconducting body, a base electrode, an emitter electrode, a first point-contact collector electrode of platinum-iridium material and a second point-contact collector electrode of Phosphor bronze material, the steps of applying an electrical current in the reverse direction between said first collector and said base electrodes and in the forward direction between said emitter and base electrodes and simultaneously impressing a short and intense pulse of current in the forward direction between said first collector and said base electrodes, interrupting said current flow, and thereafter applying an electrical current in the reverse direction between said second collector and said base electrodes and in the forward direction between said emitter and said base electrodes and simultaneously impressing a short and intense pulse of current in the reverse direction between said second collector and said base electrodes, thereby producing a high output impedance and a current gain less than unity over an appreciable operating range for said first collector electrode, and a low output impedance and a current gain greater than unity over an appreciable operating range for said second collector electrode.

3. A semiconductor device comprising a semiconducting body, a base electrode, an emitter electrode, and first and second point-contact collector electrodes, said electrodes being in contact with said body and said first collector being of platinum-iridium material and said second collector being of Phosphor bronze material, said device being electrically treated by passing a short and intense pulse of current in the forward direction between said first collector and said base electrodes and in the reverse direction between said second collector and said base electrodes under a condition of steady current flow in the reverse direction between said collector and base electrodes and in the forward direction between said emitter and base electrodes.

4. A semiconductor device comprising a semiconducting body, a base electrode, an emitter electrode, and first and second point-contact collector electrodes, said electrodes being in contact with said body and said first collector being selected from the group comprising platinum-iridium and tungsten and said second collector being of a donor-including material, said device being electrically treated by passing a short and intense pulse of current in the forward direction between said first collector and said base electrodes and in the reverse direction between said second collector and said base electrodes under a condition of steady current flow in the reverse direction between said collector and base electrodes and in the forward direction between said emitter and base electrodes.

5. A semiconductor device comprising a semiconducting body, a base electrode, an emitter electrode, and first and second point-contact collector electrodes, said electrodes being in contact with said body and said first collector being of platinum-iridium material and said second collector being of a donor-including material, said device being electrically treated by passing a short and intense pulse of current in the forward direction between said first collector and said base electrodes and in the reverse direction between said second collector and said base electrodes under a condition of steady current flow in the reverse direction between said collector and base electrodes and in the forward direction between said emitter and base electrodes.

References Cited in the file of this patent

UNITED STATES PATENTS

| | | |
|---|---|---|
| 2,586,080 | Pfann | Feb. 19, 1952 |
| 2,623,170 | Dickinson | Dec. 23, 1952 |
| 2,666,873 | Slade | Jan. 19, 1954 |
| 2,670,445 | Felker | Feb. 23, 1954 |
| 2,686,279 | Barton | Aug. 10, 1954 |
| 2,709,780 | Kircher | May 31, 1955 |
| 2,746,121 | Anderson | May 22, 1956 |
| 2,755,536 | Dickinson | July 24, 1956 |